US011233664B2

(12) United States Patent
McMillan

(10) Patent No.: US 11,233,664 B2
(45) Date of Patent: Jan. 25, 2022

(54) METHODS AND APPARATUS TO IDENTIFY MEDIA

(71) Applicant: The Nielsen Company (US), LLC, New York, NY (US)

(72) Inventor: Gavin McMillan, Tarpon Springs, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 16/355,262

(22) Filed: Mar. 15, 2019

(65) Prior Publication Data
US 2019/0215169 A1 Jul. 11, 2019

Related U.S. Application Data

(63) Continuation of application No. 14/556,197, filed on Nov. 30, 2014, which is a continuation of application
(Continued)

(51) Int. Cl.
*H04L 9/36* (2006.01)
*G06F 21/16* (2013.01)
*G07F 17/32* (2006.01)

(52) U.S. Cl.
CPC ............ *H04L 9/36* (2013.01); *G06F 21/16* (2013.01); *G07F 17/32* (2013.01); *G07F 17/3241* (2013.01); *H04L 2209/608* (2013.01)

(58) Field of Classification Search
CPC ........ H04L 63/10; H04H 60/31; H04H 60/33; H04N 21/258; H04N 21/442; H04N 21/44204; H04N 21/25866; G06F 21/629
(Continued)

(56) References Cited

U.S. PATENT DOCUMENTS 5,887,136 A 3/1999 Yasuda et al.
5,915,027 A 6/1999 Cox et al.
(Continued)

FOREIGN PATENT DOCUMENTS

EP 1220151 7/2002
JP 3880162 2/2007
(Continued)

OTHER PUBLICATIONS

IP Australia, "Examination Report," dated Mar. 25, 2020 in connection with Australian Patent Application No. 2018282417, 3 pages.
(Continued)

*Primary Examiner* — Venkat Perungavoor
*Assistant Examiner* — Peiliang Pan
(74) *Attorney, Agent, or Firm* — Hanley, Flight & Zimmerman, LLC

(57) ABSTRACT

Methods and apparatus for identifying media are described. Example methods disclosed herein include presenting a graphical enable button via a display of a media presentation device, the graphical enable button, when selected, is to enable monitoring functionality implemented by the media presentation device, the monitoring functionality to monitor media presented by the media presentation device, the monitoring functionality to be disabled by default. Disclosed example methods also include detecting a first user input corresponding to selection of the graphical enable button and, in response to detection of the first user input: (i) enabling the monitoring functionality implemented by the media presentation device, and (ii) transmitting, via a network interface, information to a remote monitoring entity.

18 Claims, 7 Drawing Sheets

Related U.S. Application Data

No. PCT/US2013/068635, filed on Nov. 6, 2013, which is a continuation of application No. 13/671,341, filed on Nov. 7, 2012, now Pat. No. 8,874,924.

(58) Field of Classification Search
USPC .......................................................... 713/176
See application file for complete search history.

(56) References Cited

U.S. PATENT DOCUMENTS

| | | | |
|---|---|---|---|
| 5,987,997 A * | 11/1999 | Roskam | G01F 1/667 73/861.29 |
| 6,208,745 B1 | 3/2001 | Florencio et al. | |
| 6,285,775 B1 * | 9/2001 | Wu | G06T 1/0042 382/100 |
| 6,748,320 B2 | 6/2004 | Jones | |
| 6,804,779 B1 | 10/2004 | Carroni et al. | |
| 6,819,774 B2 | 11/2004 | Nguyen | |
| 7,224,799 B2 | 5/2007 | Mase | |
| 7,577,769 B2 * | 8/2009 | Cobb | G06F 9/4411 710/18 |
| 7,668,334 B2 | 2/2010 | Reed et al. | |
| 7,827,312 B2 * | 11/2010 | Ramaswamy | H04H 20/95 709/246 |
| 8,085,975 B2 | 12/2011 | Srinivasan | |
| 8,090,822 B2 * | 1/2012 | Lee | G06K 9/2072 709/218 |
| 8,103,049 B2 | 1/2012 | Petrovic et al. | |
| 8,225,342 B2 | 7/2012 | Mears et al. | |
| 8,488,837 B2 | 7/2013 | Bae et al. | |
| 8,639,629 B1 | 1/2014 | Hoffman | |
| 8,768,838 B1 | 7/2014 | Hoffman | |
| 8,874,924 B2 | 10/2014 | McMillan | |
| 2002/0032906 A1 | 3/2002 | Grossman | |
| 2002/0033844 A1 * | 3/2002 | Levy | G06F 3/0484 715/744 |
| 2002/0072975 A1 | 6/2002 | Steele et al. | |
| 2002/0112048 A1 | 8/2002 | Gruyer et al. | |
| 2002/0126869 A1 * | 9/2002 | Wang | H04N 1/32315 382/100 |
| 2002/0138730 A1 | 9/2002 | Kim | |
| 2003/0018587 A1 * | 1/2003 | Althoff | G06Q 20/40145 705/64 |
| 2003/0061607 A1 | 3/2003 | Hunter et al. | |
| 2003/0151762 A1 * | 8/2003 | Cherry | G06F 21/608 358/1.14 |
| 2003/0174861 A1 | 9/2003 | Levy et al. | |
| 2003/0188166 A1 * | 10/2003 | Pelly | G06T 1/0028 713/176 |
| 2004/0044576 A1 * | 3/2004 | Kurihara | G06Q 30/0248 705/14.41 |
| 2004/0052400 A1 | 3/2004 | Inomata et al. | |
| 2005/0015802 A1 * | 1/2005 | Masson | H04N 21/435 725/40 |
| 2005/0097331 A1 | 5/2005 | Majidimehr et al. | |
| 2005/0144632 A1 * | 6/2005 | Mears | H04H 60/31 725/15 |
| 2005/0205482 A1 * | 9/2005 | Gladney | D06F 39/007 210/264 |
| 2006/0026431 A1 | 2/2006 | Campello De Souza | |
| 2006/0083403 A1 * | 4/2006 | Zhang | G06T 1/0028 382/100 |
| 2006/0085257 A1 | 4/2006 | Johnson | |
| 2006/0107334 A1 * | 5/2006 | Leone | G06F 21/10 726/27 |
| 2007/0038728 A1 | 2/2007 | Jacobs et al. | |
| 2007/0040934 A1 * | 2/2007 | Ramaswamy | H04N 21/8352 348/385.1 |
| 2007/0130015 A1 | 6/2007 | Starr et al. | |
| 2007/0150961 A1 * | 6/2007 | Ikeda | H04L 63/102 726/27 |
| 2007/0157249 A1 * | 7/2007 | Cordray | H04N 21/26283 725/58 |
| 2007/0160082 A1 * | 7/2007 | Un | H04L 1/0061 370/469 |
| 2007/0174623 A1 * | 7/2007 | Watson | G06Q 90/00 713/176 |
| 2007/0198842 A1 | 8/2007 | Kawamae et al. | |
| 2007/0227264 A1 * | 10/2007 | Pors | A61B 8/4209 73/861.28 |
| 2007/0266252 A1 | 11/2007 | Davis et al. | |
| 2007/0277039 A1 | 11/2007 | Zhao | |
| 2007/0288952 A1 | 12/2007 | Weinblatt | |
| 2008/0103978 A1 * | 5/2008 | Houston | G06Q 50/184 705/59 |
| 2008/0142599 A1 | 6/2008 | Benillouche et al. | |
| 2008/0154718 A1 | 6/2008 | Flake et al. | |
| 2008/0172747 A1 | 7/2008 | Hurtado et al. | |
| 2008/0215436 A1 | 9/2008 | Roberts | |
| 2008/0247543 A1 * | 10/2008 | Mick | H04N 21/8358 380/201 |
| 2008/0263579 A1 * | 10/2008 | Mears | H04N 21/435 725/9 |
| 2008/0295128 A1 | 11/2008 | Aaltonen | |
| 2009/0049466 A1 * | 2/2009 | Schoettle | G06Q 30/02 725/14 |
| 2009/0055854 A1 | 2/2009 | Wright et al. | |
| 2009/0070587 A1 | 3/2009 | Srinivasan et al. | |
| 2009/0113466 A1 * | 4/2009 | Amitay | H04N 21/235 725/9 |
| 2009/0136083 A1 | 5/2009 | Picard et al. | |
| 2009/0220070 A1 | 9/2009 | Picard et al. | |
| 2009/0305680 A1 | 12/2009 | Swift et al. | |
| 2010/0063978 A1 | 3/2010 | Lee et al. | |
| 2010/0064331 A1 | 3/2010 | Cooper | |
| 2010/0205628 A1 | 8/2010 | Davis et al. | |
| 2010/0228594 A1 | 9/2010 | Chweh et al. | |
| 2010/0291907 A1 | 11/2010 | MacNaughtan et al. | |
| 2010/0325025 A1 * | 12/2010 | Etchegoyen | G06Q 30/04 705/34 |
| 2011/0055385 A1 * | 3/2011 | Tung | G06F 3/04842 709/224 |
| 2011/0239244 A1 * | 9/2011 | Karaoguz | H04N 7/163 725/14 |
| 2011/0264657 A1 | 10/2011 | Hoffman et al. | |
| 2012/0011531 A1 | 1/2012 | Levy et al. | |
| 2012/0072940 A1 | 3/2012 | Fuhrer | |
| 2012/0134548 A1 * | 5/2012 | Rhoads | G06F 9/445 382/118 |
| 2012/0150958 A1 | 6/2012 | Besehanic et al. | |
| 2012/0154633 A1 * | 6/2012 | Rodriguez | H04M 1/72569 348/231.99 |
| 2012/0197633 A1 * | 8/2012 | Aoyagi | G10L 25/69 704/201 |
| 2012/0208592 A1 * | 8/2012 | Davis | G06K 7/1443 455/556.1 |
| 2012/0209949 A1 | 8/2012 | Deliyannis et al. | |
| 2012/0240143 A1 * | 9/2012 | Mathews | H04N 21/252 725/14 |
| 2012/0254910 A1 * | 10/2012 | Donoghue | H04H 60/31 725/14 |
| 2012/0275642 A1 * | 11/2012 | Aller | G06F 3/04886 382/100 |
| 2012/0284012 A1 * | 11/2012 | Rodriguez | G06Q 30/06 704/1 |
| 2012/0290265 A1 | 11/2012 | Crystal et al. | |
| 2012/0290950 A1 | 11/2012 | Rapaport et al. | |
| 2012/0302222 A1 | 11/2012 | Williamson et al. | |
| 2013/0185162 A1 | 7/2013 | Mo | |
| 2013/0205311 A1 | 8/2013 | Ramaswamy et al. | |
| 2013/0205326 A1 | 8/2013 | Sinha et al. | |
| 2013/0297422 A1 | 11/2013 | Hunter et al. | |
| 2013/0311478 A1 * | 11/2013 | Frett | G06Q 30/02 707/741 |
| 2013/0311780 A1 | 11/2013 | Besehanic | |
| 2013/0347016 A1 | 12/2013 | Rowe | |
| 2014/0110468 A1 | 4/2014 | Kandregula | |
| 2014/0129841 A1 | 5/2014 | McMillan | |
| 2014/0344844 A1 | 11/2014 | Wright et al. | |
| 2015/0089235 A1 | 3/2015 | McMillan | |

(56) References Cited

U.S. PATENT DOCUMENTS

| | | |
|---|---|---|
| 2015/0089523 A1 | 3/2015 | Volovich et al. |
| 2015/0121073 A1* | 4/2015 | Wajs ..................... G06F 21/16 713/168 |
| 2015/0350245 A1* | 12/2015 | Twitchell, Jr. ........ H04W 12/04 726/3 |

FOREIGN PATENT DOCUMENTS

| | | |
|---|---|---|
| JP | 2008134725 | 6/2008 |
| KR | 20090064142 | 6/2009 |
| KR | 101088080 | 11/2011 |
| KR | 20120034525 | 4/2012 |
| KR | 20120042245 | 5/2012 |
| WO | 2014074543 | 5/2014 |
| WO | 2014137414 | 9/2014 |

OTHER PUBLICATIONS

IP Australia, "Examination Report," dated Jul. 4, 2020 in connection with Australian Patent Application No. 2018282417, 3 pages.
International Bureau, "International Preliminary Report on Patentability," mailed in connection with International Patent Application No. PCT/US2013/068635, dated May 21, 2015, 6 pages.
United States Patent and Trademark Office, "Non-Final Office Action," mailed in connection with U.S. Appl. No. 14/073,656, dated Jan. 20, 2015, 19 pages.
International Searching Authority, "International Search Report and Written Opinion," mailed in connection with International Patent Application No. PCT/US2013/068929, dated Feb. 27, 2014, 11 pages.
IP Australia, "Examination Report," mailed in connection with Australian Patent Application No. 2013203768, dated Jul. 11, 2014, 4 pages.
European Patent Office, "Communication Pursuant to Rules 161(2) and 162 EPC," mailed in connection with European Application No. 13853140.5, dated Jul. 2, 2015, 2 pages.
United States Patent and Trademark Office, "Non-Final Office Action," mailed in connection with U.S. Appl. No. 14/073,656, dated Nov. 13, 2015, 21 pages.
United States Patent and Trademark Office, "Final Office Action," mailed in connection with U.S. Appl. No. 14/073,656, dated Jul. 24, 2015, 28 pages.
European Patent Office, "Examination Report," mailed in connection with European Patent Application No. 13853140.5 dated Jan. 13, 2017, 6 pages.
IP Australia, "Certificate of Grant," mailed in connection with Australian Patent Application No. 2014250673, dated Sep. 1, 2016, 1 page.
European Patent Office, "Communication Pursuant to Article 94(3) EPC," mailed in connection with European Patent Application No. 13853140.5, dated Feb. 21, 2018, 8 pages.
IP Australia, "Examination Report," mailed in connection with Australian Patent Application No. 2016216648, dated Mar. 31, 2018, 3 pages.
Canadian Intellectual Property Office, "Office Action," mailed in connection with Canadian Patent Application No. 2890486, dated May 5, 2017, 3 pages.
European Patent Office, "2nd Examination Report," mailed in connection with European Patent Application No. 13853140.5, dated Aug. 10, 2017, 8 pages.
IP Australia, "Examination Report," mailed in connection with Australian Patent Application No. 2016216648, dated Sep. 16, 2017, 4 pages.
European Patent Office, "Extended Search Report," mailed in connection with European Patent Application No. 13853140.5, dated Apr. 21, 2016, 7 pages.
IP Australia, "Notice of Acceptance," mailed in connection with Australian Patent Application No. 2014250673, dated May 10, 2016, 2 pages.
Canadian Intellectual Property Office, "Office Action," mailed in connection with Canadian Patent Application No. 2,890,486, dated Jun. 10, 2016, 3 pages.
United States Patent and Trademark Office, "Notice of Allowance," mailed in connection with U.S. Appl. No. 13/671,341, dated Jun. 24, 2014, 8 pages.
United States Patent and Trademark Office, "Supplemental Notice of Allowability," mailed in connection with U.S. Appl. No. 13/671,341, dated Aug. 13, 2014, 2 pages.
IP Australia, "Patent Examination Report," mailed in connection with Australian Patent Application No. 2013203683, dated May 30, 2014, 2 pages.
IP Australia, "Notice of Acceptance," mailed in connection with Australian Patent Application No. 2013203683, dated Jul. 3, 2014, 2 pages.
International Searching Authority, "International Search Report," mailed in connection with International Patent Application No. PCT/US2013/068635, dated Feb. 18, 2014, 4 pages.
International Searching Authority, "Written Opinion of the International Search Authority," mailed in connection with International Patent Application No. PCT/US2013/068635, dated Feb. 18, 2014, 4 pages.
United States Patent and Trademark Office, "Final Office Action," mailed in connection with U.S. Appl. No. 14/556,197, dated Sep. 14, 2018, 14 pages.
United States Patent and Trademark Office, "Non-final Office Action," mailed in connection with U.S. Appl. No. 14/556,197, dated Apr. 12, 2018, 12 pages.
United States Patent and Trademark Office, "Final Office Action," mailed in connection with U.S. Appl. No. 14/556,197, dated Sep. 25, 2017, 12 pages.
United States Patent and Trademark Office, "Non-final Office Action," mailed in connection with U.S. Appl. No. 14/556,197, dated Apr. 20, 2017, 12 pages.
United States Patent and Trademark Office, "Final Office Action," mailed in connection with U.S. Appl. No. 14/556,197, dated Jul. 19, 2016, 12 pages.
United States Patent and Trademark Office, "Non-final Office Action," mailed in connection with U.S. Appl. No. 14/556,197, dated Jan. 22, 2016, 10 pages.
United States Patent and Trademark Office, "Advisory Action," mailed in connection with U.S. Appl. No. 14/556,197, dated Jul. 15, 2019, 2 pages.
United States Patent and Trademark Office, "Examiner's Answer to Appeal Brief," mailed in connection with U.S. Appl. No. 14/556,197, dated Oct. 10, 2019, 19 pages.
European Patent Office, "Summons to Oral Proceedings," mailed Apr. 30, 2019 in connection with European Patent Application No. 13853140.5, 8 pages.
IP Australia, "Examination Report No. 1," dated Aug. 31, 2019 in connection with Australian Patent Application No. 2018282417, 4 pages.
Canadian Intellectual Property Office, "Office Action," dated Jul. 26, 2019 in connection with Canadian Patent Application No. 3,021,656, 4 pages.
IP Australia, "Notice of Grant for Patent," dated Jan. 10, 2019 in connection with Australian Patent Application No. 2016216648, 1 page.
Canadian Intellectual Property Office, "Notice of Allowance," dated Apr. 20, 2018 in connection with Canadian Patent Application No. 2,890,486, 1 page.
Canadian Intellectual Property Office, "Notice of Allowance," dated Aug. 18, 2020 in connection with Canadian Patent Application No. 3,021,656, 1 page.
IP Australia, "Examination Report No. 3," dated Jul. 4, 2020 in connection with Australian Patent Application No. 2018282417, 3 pages.
IP Australia, "Examination Report No. 2," dated Mar. 25, 2020 in connection with Australian Patent Application No. 2018282417, 3 pages.
European Patent Office, "Preliminary Opinion of the Examining Division," dated Feb. 26, 2020 in connection with European Patent Application No. 13853140.5, 10 pages.

(56) References Cited

OTHER PUBLICATIONS

European Patent Office, "Summons to Attend Oral Proceedings Pursuant to Rule 115(1) EPC," mailed Apr. 9, 2020 in connection with European Patent Application No. 13853140.5, 13 pages.
European Patent Office, "Decision to Refuse a European Patent Application," dated Jan. 29, 2021 in connection with European Patent Application No. 13853140.5, 19 pages.
IP Australia, "Exam report No. 1 for standard patent application," issued in connection with Australian Patent Application No. 2020226993, dated Apr. 29, 2021, 4 pages.

\* cited by examiner

200

| Title | Internal ID | Source Identifier | Time In Content |
|---|---|---|---|
| Example Game 1 | 124353 | 5000 | 1000 |
| Example Game 2 | 124356 | 5000 | 1001 |
| Example Game 3 | 534432 | 5000 | 1002 |
| Example Game 4 | 612322 | 5000 | 1003 |

| Application | Watermark Type | Source Identifer | Time In Content |
|---|---|---|---|
| Game Platform (GP) | Final Distributor | 6100 | 1 |
| GP: Application 1 | Final Distributor | 6100 | 2 |
| GP: Application 2 | Final Distributor | 6100 | 3 |
| GP: Application 3 | Final Distributor | 6100 | 4 |

| Watermark Type | Source Identifier | Time Content | Clock Time |
|---|---|---|---|
| PC | 5000 | 1000 | 2:12:00 |
| FD | 6100 | 1 | 2:12:02 |
| PC | 5000 | 1000 | 2:12:04 |
| FD | 6100 | 1 | 2:12:06 |
| PC | 5000 | 1000 | 2:12:08 |
| FD | 6100 | 1 | 2:12:10 |

FIG. 5

METHODS AND APPARATUS TO IDENTIFY MEDIA

RELATED APPLICATIONS

This patent is a continuation of U.S. patent application Ser. No. 14/556,197, filed Nov. 30, 2014, entitled "METHOD AND APPARATUS TO IDENTIFY MEDIA," which is a continuation of International Application No. PCT/US13/68635, filed Nov. 6, 2013, entitled "METHOD AND APPARATUS TO IDENTIFY MEDIA," which is a continuation of U.S. patent application Ser. No. 13/671,341, filed Nov. 7, 2012, entitled "METHOD AND APPARATUS TO IDENTIFY MEDIA." Priority to U.S. patent application Ser. No. 14/556,197, International Application No. PCT/US13/68635 and U.S. patent application Ser. No. 13/671,341 is claimed. U.S. patent application Ser. No. 14/556,197, International Application No. PCT/US13/68635 and U.S. patent application Ser. No. 13/671,341 are hereby incorporated by reference herein in their respective entireties.

FIELD OF THE DISCLOSURE

This disclosure relates generally to media, and, more particularly, to methods and apparatus to identify media.

BACKGROUND

Media producers, media providers, advertisers, product manufactures represented in advertisements, and many other entities utilize information about the presentation of media. Such information is often collected through the use of panels comprised of persons (e.g., panelists) who have agreed to have their exposure to media monitored. For example, audio of media may be transmitted with identifying information (e.g., embedded watermarks or codes) that identifies the media. Panelists may be supplied with meters (e.g., portable meters carried and/or worn by the panelists) that collect the audio and extract the identifying information. The information may be transmitted to a collection facility where the results from multiple panelists are combined to generate reports comprising information about media presentation.

BRIEF DESCRIPTION OF THE DRAWINGS

FIGS. 2 and 3 illustrate example lookup tables.

FIG. 5 is a table illustrating a sequence of example watermarks inserted in media.

DETAILED DESCRIPTION

Figure 1:
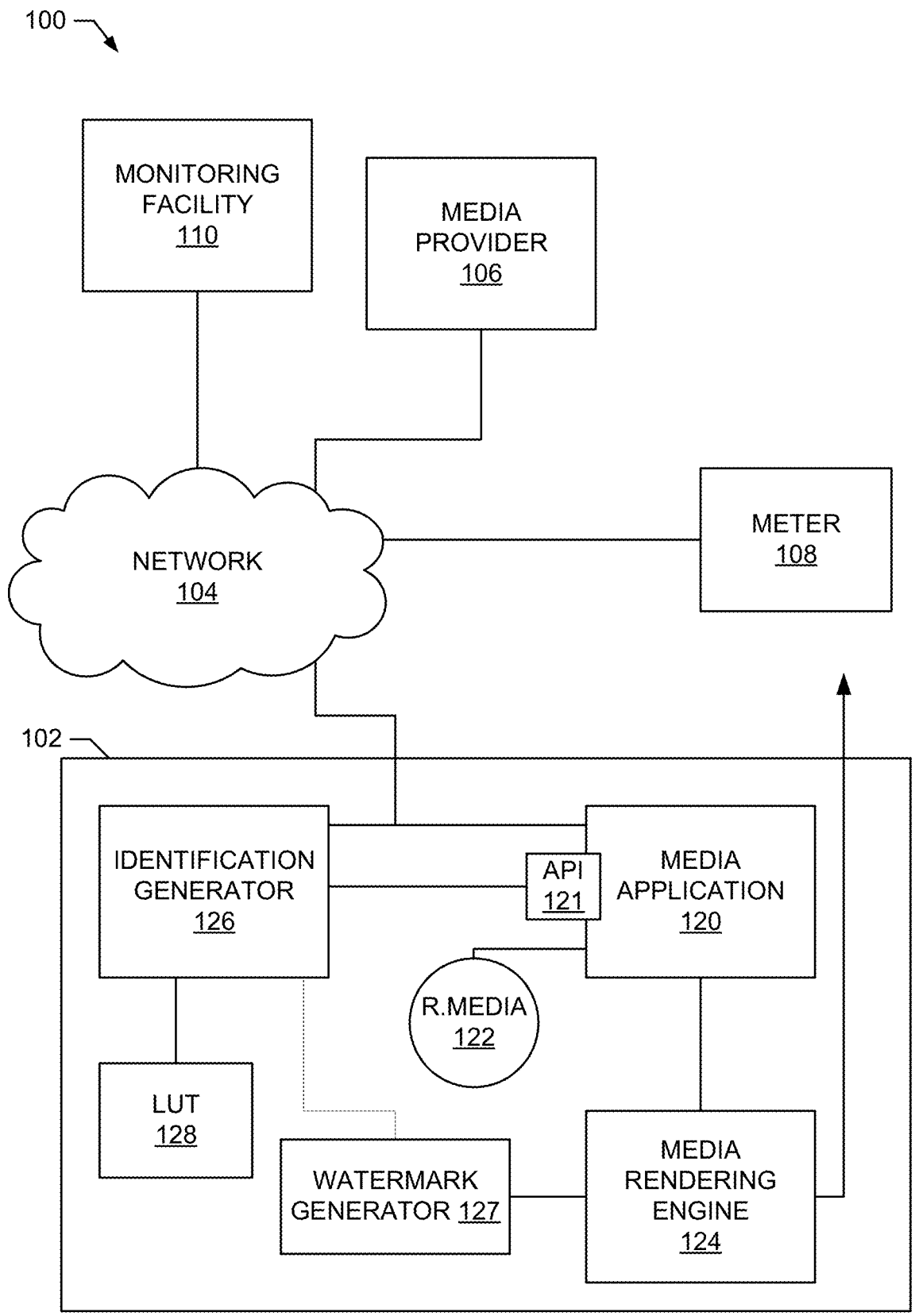
FIG. 1 is a block diagram of an example system constructed in accordance with the techniques of this disclosure for identifying media.

Embedding identification information in media (e.g., content, advertisements, audio, video, movies, commercials, television programs, radio programs, video games, etc.) is often performed at or on behalf of a media provider. Such embedding relies on cooperation with media providers. Obtaining such cooperation may be complicated due to the large number of media providers across different media platforms (e.g., terrestrial television, cable television, satellite television, Internet television, Sony PlayStation® video games, Nintendo® video games, Microsoft® video games, movie producers, video on demand, CD's, DVD's, etc.). Furthermore, media providers may be unwilling or unable to cooperate.

Methods and apparatus described herein embed identification information in media utilizing a media presentation device that renders the media for presentation (e.g., a media presentation device at a panelist home). In some examples, such methods and apparatus rely on little or no cooperation from media providers. The use of computational resources of the media providers is, thus, reduced. Furthermore, by embedding identification at the media presentation device, further information about the audience/the device and/or applications executing on the device can be included in the embedded identification information.

In some disclosed examples, a media presentation device determines identification information for an application executing on the media presentation device. For example, the application may be an application controlling media presentation (e.g., an operation system component presenting a video game, a cloud video distribution application (e.g., Netflix®, Hulu®, MLBtv®, etc.), a digital versatile disk (DVD) decoding application, a Flash program, etc.). The media presentation device determines an identifier for the application by consulting a lookup table. The media presentation device inserts the identifier as a watermark in the media so that the media is presented with the embedded watermark identifier. In some examples, the media presentation device additionally or alternatively determines identification information for media presented by the application (e.g., a manufacturer identification number embedded in a video game DVD, an identifier of a video distributed by a cloud video distribution application, metadata associated with media, an originating internet protocol address of streaming media, etc.). The media presentation device determines an identifier for the media by consulting a lookup table (e.g., a second lookup table) or algorithm to produce an appropriate watermark identifier. The media presentation device inserts the identifier for the media as a watermark in the media. In some examples, a first level watermark (e.g., corresponding to the application identifier) and a second level watermark (e.g., corresponding to the media identifier) are inserted in the media in an interleaved manner. Where two levels of watermarks are used, the first level can be used to identify the media content, and the second level can identify the media presentation device or application. In some examples, after the watermarked media output by the media presentation device, the watermarks are detected by a meter and are sent to a data collection facility for analysis and/or reporting.

In examples disclosed herein, any type of watermarking (e.g., video watermarking, audio watermark, etc.) or any other technique for embedding identifying information in media may be utilized. For example, watermarks may be embedded as Nielsen Watermarks codes (a.k.a. Nielsen codes) of The Nielsen Company (US), LLC, as Arbitron audio encoding watermarks, etc. Example methods, systems, and apparatus to encode and/or decode audio watermarks are disclosed in U.S. patent application Ser. No. 12/551,220, entitled "Methods and Apparatus to Perform Audio Watermarking and Watermark Detection and Extraction," filed Aug. 31, 2009, U.S. patent application Ser. No. 12/464,811, entitled "Methods and Apparatus to Perform Audio Watermarking and Watermark Detection and Extraction," filed May 12, 2009, U.S. patent application Ser. No. 12/249,619, entitled "Methods and Apparatus to Perform Audio Watermarking Detection and Extraction," filed Oct. 10, 2008, all of which are hereby incorporated by reference in their entireties.

FIG. 1 is a block diagram of an example system 100 constructed in accordance with the techniques of this disclosure for identifying media. The example system 100 includes a media presentation device 102, a meter 108, and a monitoring facility 110. In the illustrated example, media may be delivered to the media presentation device 102 via one or more media providers 106. Such media may be provided via a network 104, via a terrestrial broadcast system, via a satellite broadcast system, via an Internet broadcast system, etc. Media may also be provided to the media presentation device 102 on removable media 122 that is described in further detail herein.

The media presentation device 102 of the illustrated example receives and/or outputs media for presentation. For example, the media presentation device 102 may be a set-top box, an integrated receiver decoder, a video game console, a disk media player (e.g., a DVD player, Blu-ray player, a compact disk (CD) player), a television, a computing device, etc. The media presentation device 102 may present the media via an integrated output device (e.g., where the media presentation device 102 is a television) or via a second device (e.g., via external speakers and/or video display). Thus, the media presentation device 102 may output the media via its own functionality and/or to another device that presents the media (e.g., a television, speakers, etc.). The example media presentation device 102 of FIG. 1 includes a media application 120, removable media 122, a media rendering engine 124, an identification generator 126, a watermark generator 127, and a lookup table 128.

The media application 120 interfaces with and causes presentation of media by the media rendering engine 124. The media application may be integrated with an operating system of the media presentation device 102 (e.g., an application to present video games on gaming disks inserted in a Sony PlayStation) or may be an application apart from the operating system (e.g., an application associated with an entity different from the manufacturer of the media presentation device 102 such as a Netflix application executing on a Sony PlayStation). The media may be stored on a removable tangible storage medium 122 (e.g., a DVD, a CD, a Blu-ray, a flash memory), retrieved from the media provider 106 via the network 104, obtained from a broadcast or unicast system, stored on a local tangible storage medium of the media presentation device 102 (e.g., a hard disk drive), or stored on any other tangible storage medium.

The media application 120 directs the media to the media rendering engine 124 for rendering and presentation. The media application 120 of the illustrated example also includes an interface 121 (e.g., an application programming interface (API)) that enables the identification generator 126 to obtain information about media handled by the media application 120. The identification generator 126 and access to the identification information are described in further detail below. In some examples, while the operating system of the media presentation device 102 is aware of the identity of the media application 120 the media presentation device 102 may not be apprised of the identity of media presented by the media application 120. In such examples, the media application 120 may allow the identification generator 126 to access identifying information for the media (e.g., using the API 121 or any other interface to the media application 120).

The media rendering engine 124 of the illustrated example receives media via the media application 120 and renders the media for presentation. For example, the media rendering engine 124 may include an audio subsystem to render audio for presentation, a video subsystem to render video for presentation, etc. For example, if the example media presentation device 102 is implemented as a video gaming system, the media rendering engine 124 may render the media as it is dynamically generated by the media application 120 in order to display the gaming environment. For example, if the example media presentation device 102 is presenting a movie on a DVD, the media rendering engine 124 decodes and renders the movie for presentation on a display.

The media rendering engine 124 of the illustrated example also includes an interface (e.g., an API) that allows the identification generator 126 to access the media to be rendered. For example, the identification generator 126 of the illustrated example cooperates with the watermarking generator 127 by sending the media watermark generator 127 for watermarking prior to output of the media by the media presentation device 102. For example, the watermark generator 127 may access the media and embed watermarks in real-time as the media is rendered. Such real-time encoding may be advantageous in, for example, video gaming media presentation devices 102 where the media (e.g., the audio of the media) is dynamic and based on the play of the game.

The example identification generator 126 of the illustrated example determines application identification information for the media application 120 via an operating system of the media presentation device 102. Alternatively, the identification generator 126 may determine the application identification information for the media application 120 from any other source (e.g., by querying the API 121 of the media application 120). The application identification information for the media application 120 may be a name of the media application 120, an identification number of the media application 120, a globally unique identifier (GUID) of the media application 120, a manufacturer identifiers, an identifier embedded in the application, or any other unique or semi-unique identifier for the media.

The example identification generator 126 also determines media identification information for media to be presented by and/or currently presented by the media application 120 by querying the API 121 of the media application 120. The media identification information may be any information useful for identifying the media such as a name of the media, an identification number for the media (e.g., an identification number embedded in the media, an identification number embedded on a storage disk on which the media is stored, etc.), an identifier embedded in the media, a manufacturer identifier, or any other unique or semi-unique identifier for the media.

The identification generator 126 of the illustrated example accesses the lookup table 128 using the application identification information for the media application 120 and/or the media identification information for the media to determine application and/or media identification information to be embedded in the media. In particular, the example identification generator 126 determines application identification information to be embedded in a first watermark identifying the media application 120 and media identification information to be embedded in a second watermark identifying the media. The identification generator 126 passes application and/or media identifying information to the watermark generator 127. The watermark generator 127 generates the watermark(s) and inserts the watermark in media received from the media rendering engine 124. For example, the watermark generator 127 may generate watermark(s) as audio having tones at emphasized frequencies that are integrated with the audio of the media from the media rendering engine 124. The audio watermarking tones may be generated using psychoacoustic masking to reduce the perceptibility of the watermark(s) by humans exposed to the audio.

The watermark generator 127 of the illustrated example embeds identifying information in media received from the media rendering engine 124. The watermark generator 127 may generate the watermarks using any technique for embedding identifying information in media (e.g., generating watermarks to be mixed into audio of the media, generating image watermarks to be overlaid on the video of the media, etc.). The watermark generator 127 receives the media from the media rendering engine 124 and inserts the watermark in the media. For example, the watermark generator 127 may generate the watermark information in real-time or almost real-time to insert the watermarks into the media without causing human-noticeable delay in the media rendering.

In the illustrated example, the watermark generator 127 interleaves a first watermark identifying the media application 120 with a second watermark identifying the media. For example, FIG. 5 is a table 500 illustrating a sample sequence of watermarks inserted into media by the watermark generator 127. As illustrated in FIG. 5, the example watermarks are inserted every two seconds and alternate between a Program Content (PC) watermark identifying media (e.g., Example Game 1 according to the lookup table 200 of FIG. 2) and a Final Distributor (FD) watermark identifying an executing media application (e.g., an example Game Platform operating software for presenting a video game according to the lookup table 300 of FIG. 3). In some examples, the FD watermarks are inserted in a 1:1 relationship with the PC watermarks. Alternatively, the watermarks may be inserted in different proportions (e.g., the media watermark may be presented more frequently when the application watermark changes less frequently).

Figure 4:
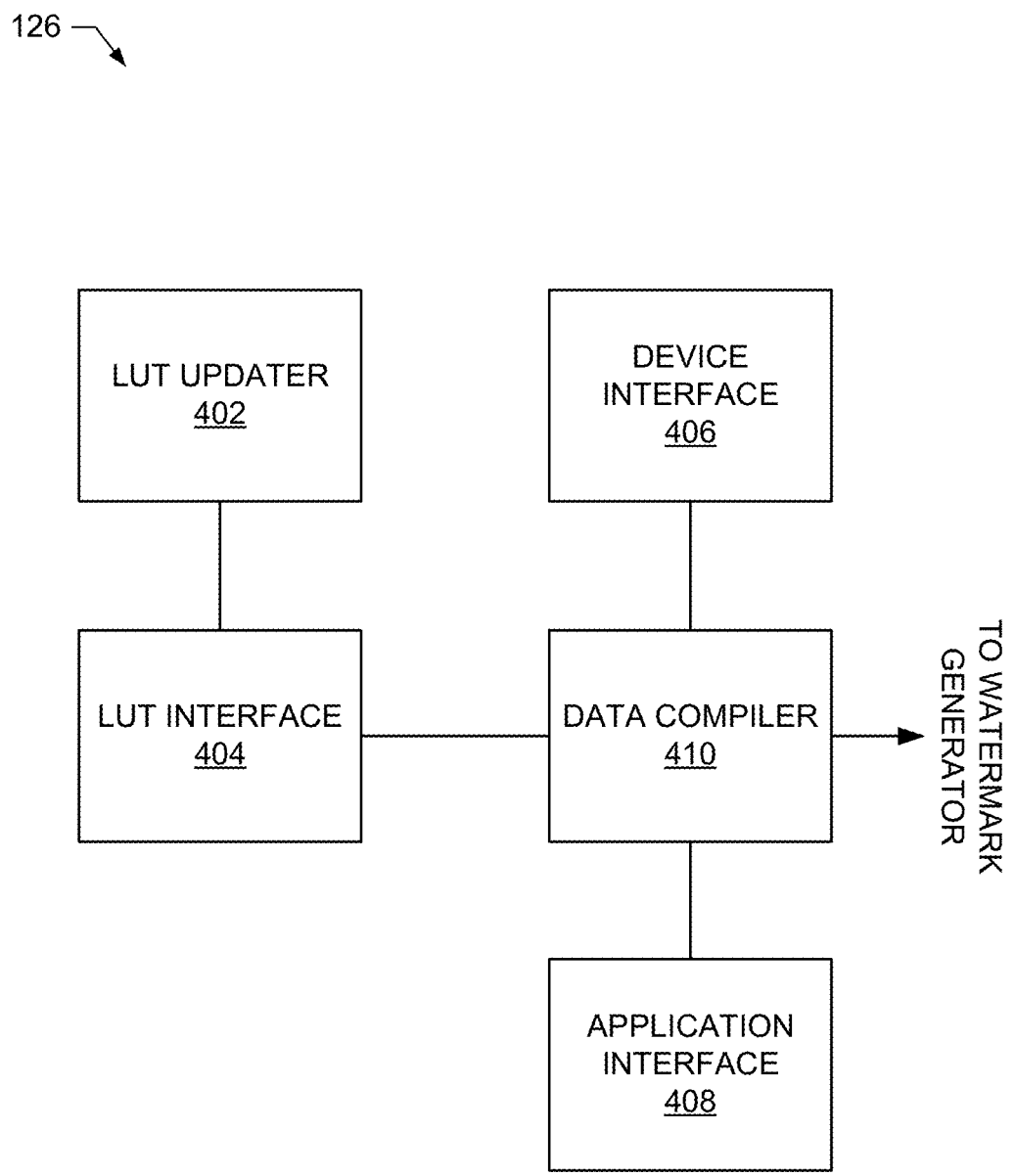
FIG. 4 is a block diagram of the example identification generator of FIG. 1.

Example implementations of the identification generator 126 and the watermark generator 127 are described in further detail in conjunction with FIG. 4.

The lookup table 128 of the illustrated examples associate application and/or media identification information with example watermark(s). The lookup table 128 of the illustrated example includes two tables as illustrated in FIGS. 2-3. The lookup table 200 of FIG. 2 associates media identifying information (e.g., manufacturer identifiers for video games in the illustrated example) and information to be inserted in the media via a watermark. In the illustrated example, the information to be inserted in the media via watermark(s) is Source Identifier and Time In Content fields that are often included in other types of watermarks (e.g., these fields are typically included in watermarks inserted by media providers at the instruction of media monitoring entities). For example, by utilizing watermarking fields that are commonly used (e.g., commonly used by media providers, such as a television media providers, to watermark media, the watermarks can be extracted by a metering device typically used for extracting such commonly used watermarks (e.g., a meter that is utilized to monitor media from television media providers). Accordingly, meters may not need to be modified to extract and communicate the watermarks described herein. The lookup table 300 of FIG. 3 associates application identifying information (e.g., information for applications of a video gaming platform) with a Watermark Type, Source Identifier, and Time In Content information to be inserted in media via watermark(s). While example fields of data to be included in a watermark are described any number and/or types of fields may be inserted in the media (e.g., inserted in the media as a watermark). The lookup table 128 may alternatively include any number of tables or may be implemented by a single table. The lookup table 128 may be implemented by any type of datastore for associating information including a table, a database, etc.

Returning to the system 100 of FIG. 1, the network 104 of the illustrated example communicatively couples the media presentation device 102 with the network 104, the media provider 106, and the monitoring facility 110. The example network 104 also communicatively couples the meter 108 to the monitoring facility 110. For example, the network 104 may be the Internet. Alternatively, the network 104 may be implemented by any number of networks such as local area networks, wide area networks, wireless networks, wired networks, etc.

The example media provider 106 of FIG. 1 provides media (e.g., on demand video media) to the media application 120 for presentation by the media presentation device 102. For example, the media provider 106 may provide cloud access to a library of movies (e.g., Netflix, Hulu, Amazon® videos, etc.). Additionally or alternatively, the media provider 106 may provide any other type(s) of media and may provide media in any other manner.

The meter 108 of the illustrated example detects the presentation of media by the media presentation 102 (e.g., media presented by components of the media presentation device 102 and/or media presented via another media presentation device such as a television) and extracts the watermark(s) embedded in the media. For example, the meter 108 may be a portable metering device carried by a member of a panel or a stationary meter located to meter a specific presentation device or set of presentation devices. The meter 108 may include a microphone that captures sound near the portable metering device. When such a meter 108 is near the media output by the media presentation device 102 the microphone captures the audio output by the media presentation device 102. The meter 108 of the illustrated example decodes the watermark(s) embedded in the audio. In alternative examples, the audio is sent to the monitoring facility 110 for watermark extraction. The example meter 108 of FIG. 1 temporarily stores the watermark(s) and/or media identifying information and/or application identifying information determined from watermark(s). The collected watermark(s) and/or identifying information are periodically and/or aperiodically exported to the monitoring facility 110. While a single meter 108 is illustrated in FIG. 1, any number of meters may be included in the system 100 (e.g., one meter per panelist, one meter per panel household, etc.). The meter 108 may be any type of meter such as one of the meters described in the applications incorporated in this patent by the foregoing incorporations by reference.

The monitoring facility 110 of the illustrated example receives information collected by the meter 108, stores the information, analyzes the information in conjunction with other data collected by other meters similar to the meter 108 of FIG. 1 but controlled to monitor other media presentation devices and/or panelist and/or generates reports. The example monitoring facility 110 of FIG. 1 periodically and/or aperiodically sends updated identifying information to the identification generator 126 for updating the lookup table 128. For example, periodically, aperiodically, automatically, manually, or at any other time, the monitoring facility 110 may send identifying information for new media (e.g., a new video game that is released) to the identification generator 126 via the network 104. Accordingly, the lookup table 128 can be updated to include the latest identifying information. Alternatively, the monitoring facility 110 may not update the lookup table 128 or may provide updates to the lookup table 128 in any other manner.

Figure 8:
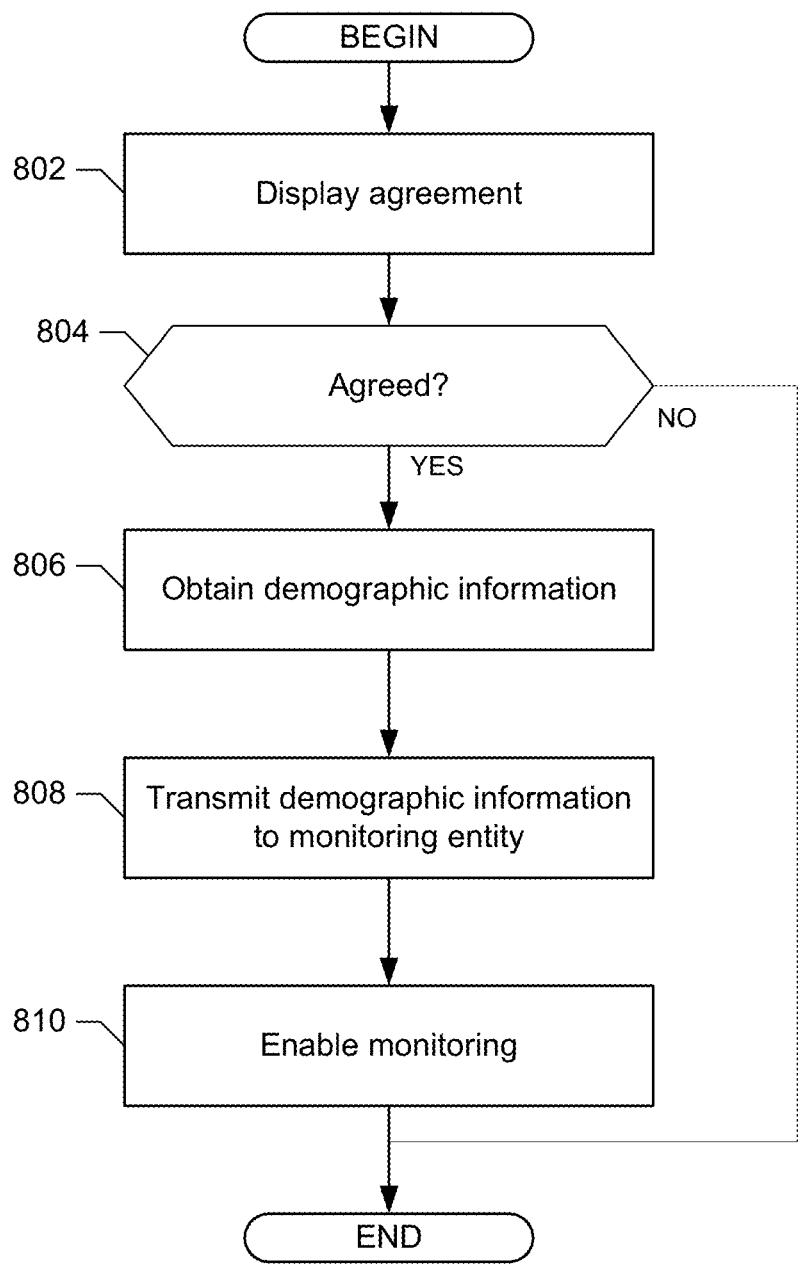
FIG. 8 is a flowchart representative of example machine readable instructions for enabling monitoring functionality on the media presentation device of FIG. 1.

According to the illustrated example, the identification generator 126, the watermark generator 127, and the lookup table 128 are provided by an operator of the monitoring facility 110 to a manufacturer of the media presentation device 102 for inclusion in the media presentation device 102 at the time of manufacture. For example, the identification generator 126 may be provided as a software development kit (SDK) for integration in the media presentation device 102. In such examples, the identification generator 126, the watermark generator 127, and/or the lookup table 128 may exist dormant in the media presentation device unless and until a purchaser of the product agrees to become a panelist. A purchaser may agree to become a panelist in any way (e.g., by calling the monitoring company, entering data including the internet protocol address of the purchased device, accessing a menu in the purchased device, etc.). In such examples, the purchaser is provided an opportunity to become a panelist. For instance, a consumer electronic device such as a television or electronic gaming system may be sold as "ratings ready" (e.g., as illustrated in FIG. 8) and, optionally, a rebate on the purchase may be provided in exchange for the purchaser agreeing to be anonymously monitored by the embedded monitoring software. In some examples, activating the monitoring functionality includes providing demographic data to the monitoring entity and/or receiving approval of an agreement (e.g., by selecting an "I Agree" user input) when activating the monitoring functionality. Alternatively, the identification generator 120 and the lookup table 128 may be included in the media presentation device 102 in any other manner (e.g., implemented and integrated by the manufacturer of the media presentation device 102, installed on the media presentation device 102 by a user of the media presentation device 102, installed on the media presentation device 102 by an agent of an operator of the monitoring facility 110, pushed to the media presentation device 102 by the monitoring facility 110, and so forth.

FIG. 4 is a block diagram of an example implementation of the example identification generator 126 of FIG. 1. The example identification generator 126 of FIG. 4 includes a lookup table updater 402, a lookup table interface 404, a device interface 406, an application interface 408, and a data compiler 410.

The lookup table updater 402 receives updated identifying information for the lookup table 128 of FIG. 1 via, for example, the network, and updates the lookup table 128 via the lookup table interface 404. The lookup table updater 402 may add to, delete, and/or update information in the lookup table 128. According to the illustrated example, the updated media and/or application identifying information is received from the monitoring facility 110 via the network 104. Alternatively, updated identifying information may be received from any other source such as a removable storage associated with the media presentation device 102, data input by an operator of the media presentation device 102, etc.

The lookup table interface 404 is an interface to the lookup table 128 for the lookup table updater 402 and the data compiler 410. For example, the lookup table interface 404 may be a database engine that facilitates queries and/or other access to the lookup table 128. Alternatively, the lookup table interface 404 may be any other type of interface and/or may be integrated in one or both of the lookup table updater 402 and/or the data compiler 410.

The device interface 406 of the illustrated example interfaces with an operating system of the media presentation device 102 to obtain information about applications executing on (or about to execute on) the media presentation device 102. For example, the device interface 406 may obtain application identifying information for the media application 120 of FIG. 1 by querying the operating system of the media presentation device 102 for information about a currently executing application providing media. The device interface 406 may additionally or alternatively obtain application identifying information from a process listing, an API, a task list, processor instructions, etc. The device interface 406 provides the information about the applications to the data compiler 410.

The application interface 406 of the illustrated example interfaces to an application executing on the media presentation device 102 (e.g., the media application 120) to obtain information about media presented by (or about to be presented by) the application. For example, the application interface 406 may obtain identifying information for the media by querying the API 121 of the media application 120. In some examples, while the operating system of the media presentation device 102 is aware of the application executing on the media presentation device 102 (e.g., a Netflix application), the operating system may not be aware of the media presented by the application (e.g., a movie selected by an operator of the media presentation device 102). Accordingly, the application interface 406 can determine identifying information for the media even when the identifying information is not known to the operating system of the media presentation device 102. The application interface 406 provides the information about the media to the data compiler 410.

The data compiler 410 receives application identifying information f from the device interface 406 and receives media identifying information from the application interface 408. The data compiler 410 queries the lookup table 128 via the lookup table interface 404 to obtain watermark information for the identifying information, and passes the watermark information to the watermark generator 127 of FIG. 1 for insertion into the media.

While an example manner of implementing the example system 100 has been illustrated in FIG. 1 and an example manner of implementing the example identification generator 126 and/or the watermark generator 127 of FIG. 1 has been illustrated in FIG. 4, one or more of the elements, processes and/or devices illustrated in FIGS. 1 and/or 4 may be combined, divided, re-arranged, omitted, eliminated and/or implemented in any other way. Further, the example media presentation device 102, the example media provider 106, the example meter 108, the example monitoring facility 110, the example media application 120, the example media rendering engine 124, the identification generator 126, and the watermark generator 127 of FIG. 1 and the example lookup table updater 402, the example lookup table interface 404, the example device interface 406, the example application interface 408, and the example data compiler 410 of FIG. 4 and more generally the example system 100 of FIG. 1 may be implemented by hardware, software, firmware and/or any combination of hardware, software and/or firmware. Thus, the example media presentation device 102, the example media provider 106, the example meter 108, the example monitoring facility 110, the example media application 120, the example media rendering engine 124, the identification generator 126, and the watermark generator 127 of FIG. 1 and the example lookup table updater 402, the example lookup table interface 404, the example device interface 406, the example application interface 408, and the example data compiler 410 of FIG. 4 and more generally the example system 100 of FIG. 1 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example media presentation device 102, the example media provider 106, the example meter 108, the example monitoring facility 110, the example media application 120, the example media rendering engine 124, the identification generator 126, and the watermark generator 127 of FIG. 1 and the example lookup table updater 402, the example lookup table interface 404, the example device interface 406, the example application interface 408, and the example data compiler 410 of FIG. 4 and more generally the example system 100 of FIG. 1 are hereby expressly defined to include a tangible computer readable storage medium such as a memory or storage disk (e.g., DVD, CD, Blu-ray, etc.) storing the software and/or firmware. Further still, the example media presentation device 102, the example media provider 106, the example meter 108, the example monitoring facility 110, the example media application 120, the example media rendering engine 124, the identification generator 126, and the watermark generator 127 of FIG. 1 and the example lookup table updater 402, the example lookup table interface 404, the example device interface 406, the example application interface 408, and the example data compiler 410 of FIG. 4 and more generally the example system 100 of FIG. 1 may include one or more elements, processes and/or devices in addition to, or instead of, those illustrated in FIG. 1 and/or 4, and/or may include more than one of any or all of the illustrated elements, processes and devices.

Figure 6:
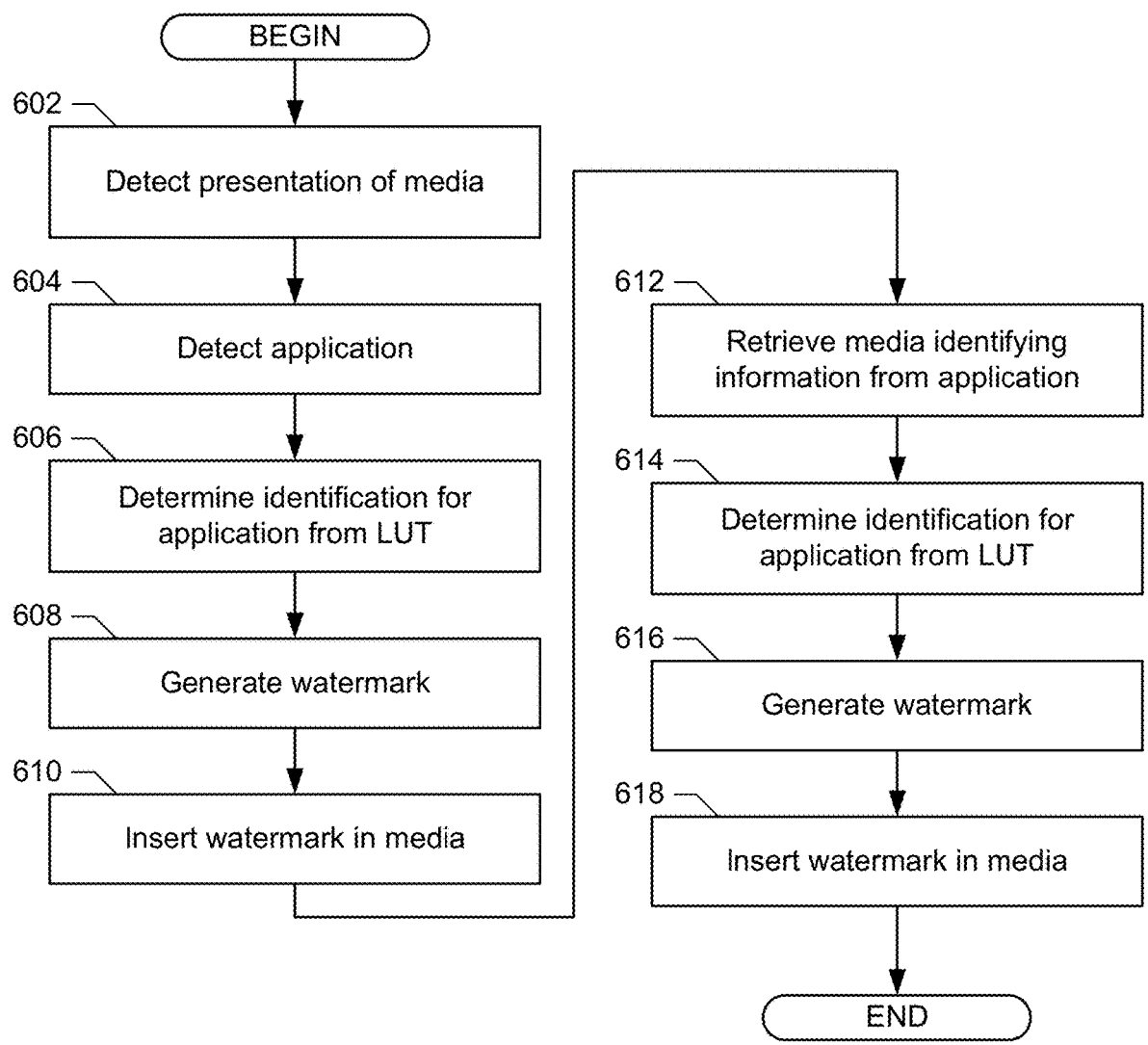
FIG. 6 is a flowchart representative of example machine readable instructions that may be executed to implement the example identification generator of FIG. 1.

Flowcharts representative of example machine readable instructions for implementing the identification generator 126 and/or the watermark generator 127 are shown in FIGS. 6 and/or 8. In the illustrated examples, the machine readable instructions comprise program(s) for execution by a processor such as the processor 912 shown in the example processing platform 900 discussed below in connection with FIG. 9. The program(s) may be embodied in software stored on a tangible computer readable storage medium such as a CD-ROM, a floppy disk, a hard drive, a digital versatile disk (DVD), a Blu-ray disk, or a memory associated with the processor 912, but the entire program(s) and/or parts thereof could alternatively be executed by a device other than the processor 912 and/or embodied in firmware or dedicated hardware. Further, although the example programs are described with reference to the flowcharts illustrated in FIGS. 6 and/or 8, many other methods of implementing, identification generator 126 and/or the watermark generator 127 may alternatively be used. For example, the order of execution of the blocks may be changed, and/or some of the blocks described may be changed, eliminated, or combined.

As mentioned above, the example processes of FIGS. 6 and/or 8 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc, and to exclude propagating signals. Additionally or alternatively, the example processes of FIGS. 6 and/or 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, brief instances, for temporarily buffering, and/or for caching of the information). As used herein, the term non-transitory computer readable medium is expressly defined to include any type of computer readable device and/or storage disk, and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The instructions of FIG. 6 begin when the device interface 406 detects presentation of media by the media presentation device 102 (block 602). For example, the device interface 406 may detect that the media application 120 has been initialized, that a command to present media has been issued, that a notification has been received from an operation system of the media presentation device 102 (e.g., due to a built-in event notification of the operation system), that a notification has been received from the application 120, etc. At block 604, the device interface 406 detects application identifying information for the media application 120 (block 604). The data compiler 410 next determines watermark identifier(s) for the application by querying the lookup table 128 via the lookup table interface 404 and using the detected application identifying information (block 606). The watermark generator 127 then generates a watermark based on the determined identifier(s) (block 608). The watermark may be static for the duration of the presentation of the media and, thus, the detection of identifying information may be performed once for the duration of the presentation of the media. Alternatively, the watermark may be dynamically generated throughout the presentation of the media and, thus, the detection of identifying information may be performed throughout the presentation of the media.

The watermark generator 127 acquires the audio of the media from the media rendering engine 124, processes the audio to inject the watermark into the audio, and returns the audio to the media rendering engine 124 (block 610). Alternatively, the watermark generator 127 may obtain and inject the watermark into video, may obtain and inject the watermark into audio and video of the media, or use any other process for watermarking media. The watermark generator 127 may be configured to always receive the audio and/or video from the media rendering engine 124. Alternatively, the watermark generator 127 may periodically receive the audio and/or video, may aperiodically receive the audio and/or video, may receive the audio and/or video upon a request from the watermark generator 127 to the media rendering engine 124, etc. The watermark generator 127 may generate a watermark including identifying information for the application in the fields of the watermark typically dedicated to the identification of media. For example, a Source Identifier field of a watermark is typically filled with information identifying a media provider, channel, broadcaster, etc. that provided media and a Time In Content field is typically filled with information indicating a position (e.g., time) from the beginning of the media. The example watermark generator 127 generates the watermark for the application as a Final Distributor watermark.

Next, the application interface 408 retrieves identifying information for the media from the media application 120 (block 612). The watermark generator 127 next determines an identifier(s) for the media by querying the lookup table 128 via the lookup table interface 404 and using the detected identifying information for the media (block 614). The data compiler 410 next determines watermark identifier(s) for the application by querying the lookup table 128 via the lookup table interface 404 and using the detected application identifying information (block 606). The watermark generator 127 then generates a watermark based on the determined identifier(s) (block 616). The watermark generator 127 acquires the audio of the media from the media rendering engine 124 (e.g., in real-time), processes the audio to inject the watermark into the audio, and returns the audio to the media rendering engine 124 (block 618). Alternatively, the watermark generator 127 may obtain and inject the watermark into video, may obtain and inject the watermark into audio and video of the media, or use any other process for watermarking media. For example, the watermark generator 127 may generate a watermark including identifying information for the application in the fields of the watermark typically dedicated to the identification of media (e.g., the Source Identifier field and the Time In Content field). The example watermark generator 127 generates the watermark for the media as a Program Content watermark.

The example instructions of FIG. 6 are complete after block 618. Alternatively, the identification generator 126 may continue to insert the generated watermarks alternating or interleaving the watermarks in the media output by the media rendering engine 122 of the media presentation device. In some examples, the identification generator 126 may include additional information in the watermark(s). For example, the watermark(s) may include an indication of the amount of time that the media is presented, information identifying portions of the media (e.g., a level of a video game, a timecode of a video, etc.), and so forth.

While the foregoing describes generating and inserting an application watermark and then generating and inserting a media watermark other implementations are possible. For example, an application watermark may be utilized without a media watermark or a media watermark may be utilized without an application watermark. Alternatively, separate processes may be utilized for application watermarking and media watermarking. In such instances, the separate processes may run in parallel, in series, and/or each process may execute without regard to the other process. In some implementations, the watermark generator 127 may check for previously inserted watermarks before inserting a watermark in media. For example, the watermark generator 127 may determine that a media watermark has already been inserted when inserting an application watermark. When a previously inserted watermark has been detected, the watermark generator 127 may utilize any known technique for inserting an additional watermark (e.g., inserting the watermark at a different time, inserting the watermark using a different encoding technique, inserting the watermark at a different frequency, setting a flag indicating the presence of multiple watermarks, etc.).

While the foregoing describes determining watermarking information using a lookup table that associates information associated with media and applications (e.g., manufacturer identifiers) with the watermark information, other approaches for determining watermark information to be inserted into media may be utilized. For example, the media identifying information and/or the application identifying information may be inserted into the watermark (e.g., in a Time in Content field and/or in a Source Identifier field). In some instances, the size(s) of the media identifying information and/or the application identifying information may exceed the capacity of the watermark payload (or may be undesirably large such that the watermarks will exceed a desired length). In such instances, the identifying information may be compacted to a size that is less than the capacity of the watermark payload and/or a size that is a less than a desired threshold. For example, if a DVD identifier on a disk is 'xyz123abc456' includes a portion that uniquely identifies the media (e.g., 'abc456') and a portion that identifies information not unique to the media (e.g., a genre, a production studio, a rating, etc.), the identification generator 126 may compact the identifier to the unique portion (e.g., 'abc456') removing the non-unique portion. Thus, the shorter, unique portion of the identifier can be inserted in a watermark payload.

Figure 7:
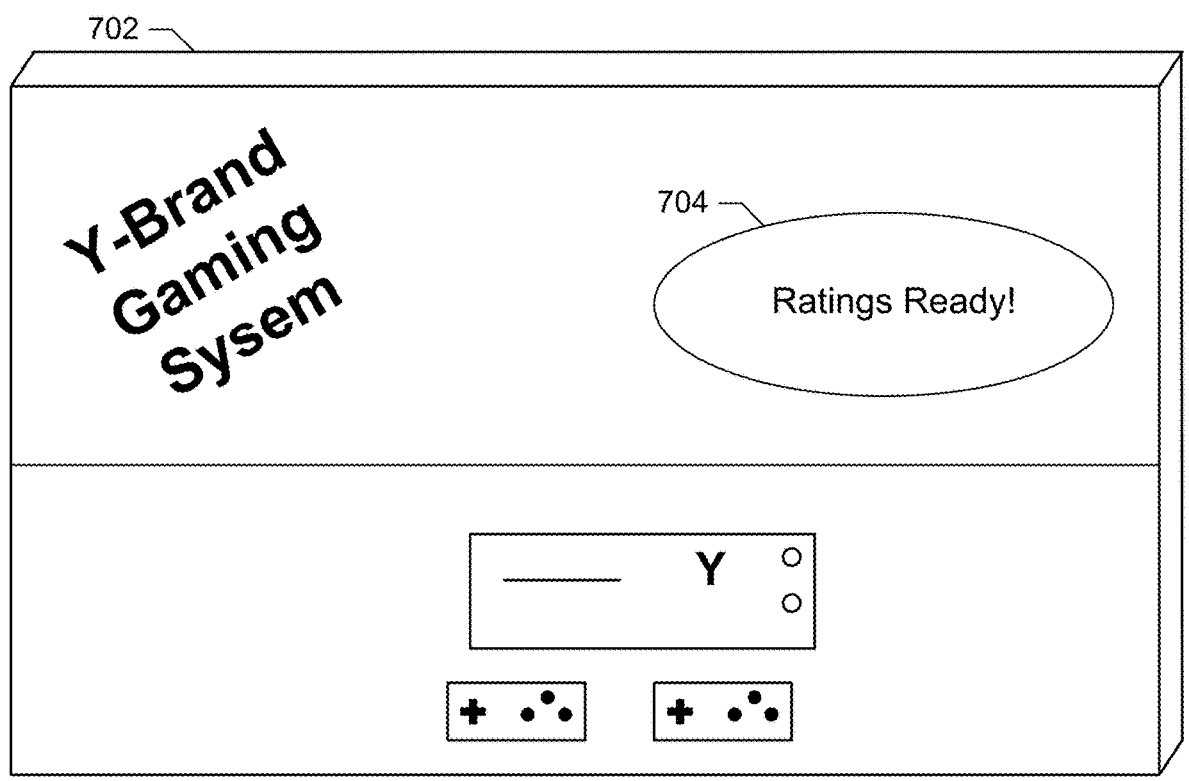
FIG. 7 illustrates example packaging for the media presentation device of FIG. 1.

FIG. 7 illustrates example packaging 702 for the media presentation device 102 of FIG. 1. According to the illustrated example, the media presentation device 102 is an electronic gaming system. The example packaging 702 includes a label 704 indicating that the media presentation device 102 is 'ratings ready.' For example, the indication of 'ratings ready' indicates to a purchaser that the media presentation device 102 has been implemented to monitor usage and send monitoring information as described in conjunction with FIG. 1. For example, the manufacturer of the media presentation device may have received an SDK from a monitoring entity and may have implemented the SDK in the media presentation device to perform the monitoring and sending monitoring information to the monitoring entity. The media presentation device 102 may be configured to perform monitoring as soon as the media presentation device 102 is powered on. Alternatively, the media presentation device 102 may request user input (e.g., accepting an agreement, enabling a setting, installing functionality (e.g., downloading monitoring functionality from the internet and installing the functionality, etc.) before enabling monitoring. Alternatively, a manufacturer of a media presentation device 102 may not include monitoring functionality in the media presentation device 102 at the time of purchase. In such instances, the monitoring functionality may be made available by the manufacturer, by a monitoring entity, by a third party, etc. for retrieval/download and installation on the media presentation device 102.

FIG. 8 is a flowchart representative of example machine readable instructions for enabling monitoring functionality on the media presentation device 102 (e.g., to implement functionality of the identification generator 126). The instructions of FIG. 8 may be utilized when the media presentation device 102 is not enabled for monitoring by default (e.g., upon purchase of the media presentation device 102). The example instructions of FIG. 8 begin when the media presentation device 102 is powered on. Alternatively, the instructions may begin when a user of the media presentation device accesses a menu to enable monitoring.

The media presentation device 102 displays an agreement that explains the monitoring process, requests consent for monitoring usage of the media presentation device 102, provides options for agreeing (e.g., an 'I Agree' button) or disagreeing ('I Disagree') (block 802). The media presentation device 102 then waits for a user to indicate a selection (block 804). When the user indicates that they disagree (e.g., do not want to enable monitoring), the instructions of FIG. 8 terminate. When the user indicates that they agree (e.g., that they want to be monitored), the media presentation device 102 obtains demographic information from the user (block 804). For example, the media presentation device 102 may display a form requesting demographic information (e.g., number of people in the household, ages, occupations, etc.). The media presentation device 102 transmits the demographic information to the monitoring entity (block 808). Transmitting the demographic information may indicate to the monitoring entity that monitoring at the media presentation device 102 is authorized. The monitoring entity may authorize a rebate for the consumer transmitting the demographic information and/or for registering for monitoring. The monitoring entity may transmit an identifier (e.g., a panelist identifier) to the media presentation device 102 for uniquely identifying monitoring information sent from the media presentation device 102 to the monitoring entity. The media presentation device 102 then enables monitoring of media presented by the media presentation device 102 (block 810). The instructions of FIG. 8 are then terminated.

Figure 9:
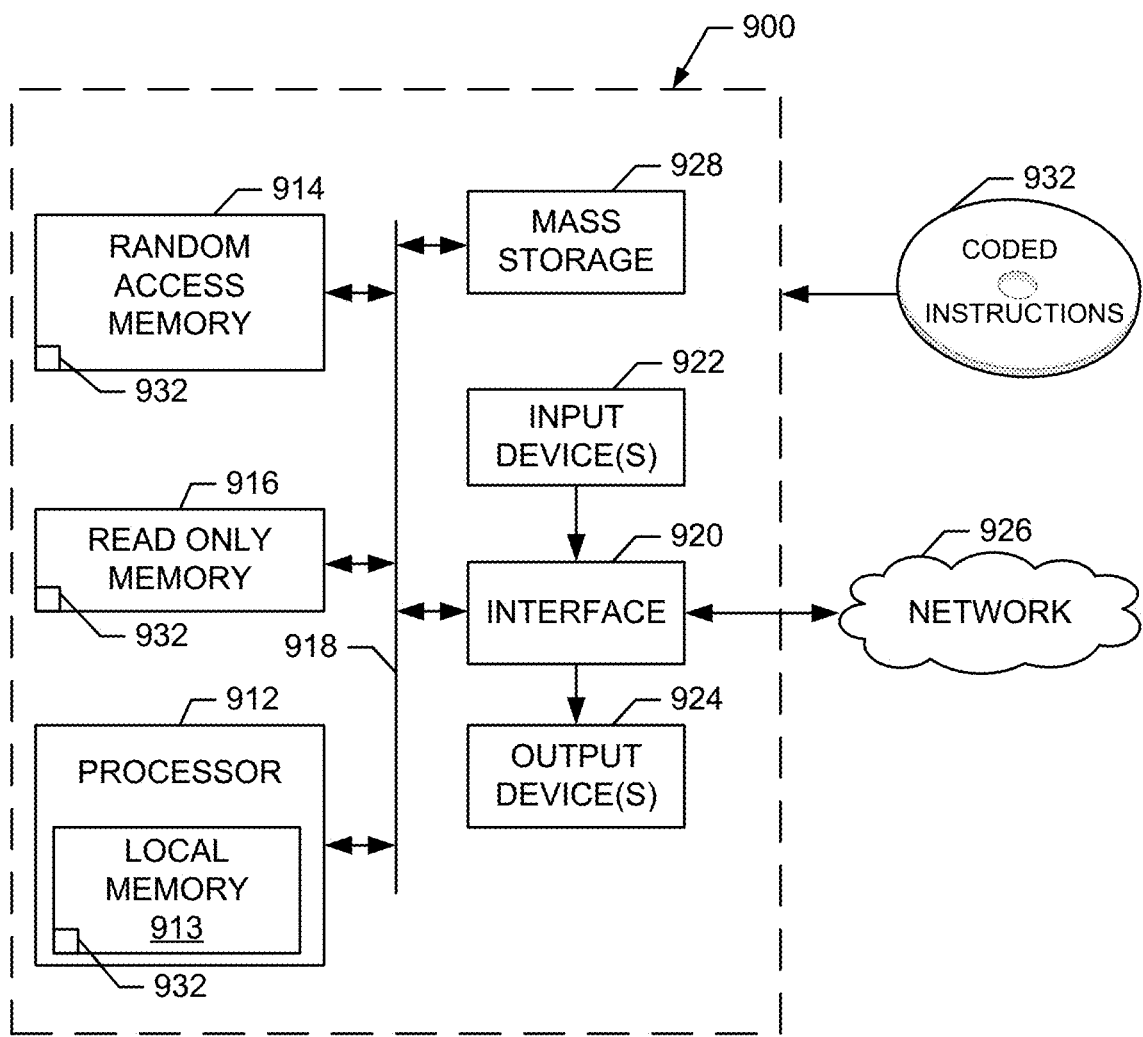
FIG. 9 is a block diagram of an example processing system that may execute the example machine readable instructions of FIGS. 6 and/or 8 to implement the example identification generator of FIGS. 1 and/or 4.

FIG. 9 is a block diagram of an example processor platform 900 capable of executing the instructions of FIGS. 6 and 8 to implement the apparatus of FIGS. 1 and 4. The processor platform 900 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The processor platform 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 916 and a non-volatile memory 914 via a bus 918. The volatile memory 916 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 914 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a digital subscriber line (DSL), a telephone line, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the example lookup table 128 of FIG. 1 and/or any other storage element.

The coded instructions 932 of FIGS. 6 and 8 may be stored in the mass storage device 928, in the volatile memory 914, in the non-volatile memory 916, and/or on a removable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A non-transitory computer readable medium comprising computer readable instructions that, when executed, cause a processor of a media presentation device to at least:
   present, via a display, a graphical enable button that, when selected, is to enable monitoring functionality implemented by the media presentation device, the monitoring functionality to monitor media presented by the media presentation device, the monitoring functionality to be disabled by default, the monitoring functionality installed in the media presentation device at a time of manufacture of the media presentation device;
   detect a first user input corresponding to selection of the graphical enable button; and
   in response to detection of the first user input:
      enable the monitoring functionality implemented by the media presentation device, the monitoring functionality including a watermark generator and a lookup table;
      transmit, via a network interface, information to a remote monitoring entity;
      receive, from the remote monitoring entity, updated identification information for updating the lookup table;
      determine application identification information for a media presentation application executing on the media presentation device;
      determine a first watermark corresponding to application identification information from the lookup table;
      request media identification information for media from the media presentation application, the media identification information associated with media to be presented by the media presentation device;

determine a second watermark corresponding to the media identification information from the lookup table; and insert the first watermark and the second watermark into the media to be presented by the media presentation device prior to the output of the media by the media device.

2. The computer readable medium of claim 1, wherein the instructions, when executed, cause the processor to present the graphical enable button in response to the media presentation device being powered on.

3. The computer readable medium of claim 1, wherein the instructions, when executed, cause the processor to:

present, via the display, a graphical disable button that, when selected, is to disable the monitoring functionality implemented by the media presentation device;

detect a second user input corresponding to selection of the graphical disable button; and disable the monitoring functionality implemented by the media presentation device in response to detection of the second user input.

4. The computer readable medium of claim 1, wherein the instructions, when executed, cause the processor to present the graphical enable button in response to access of a menu to be presented by the media presentation device.

5. The computer readable medium of claim 1, wherein the information includes demographic information, and the instructions, when executed, further cause the processor to present a form via the display in response to the detection of the first user input, the form to request the demographic information.

6. The computer readable medium of claim 5, wherein the information includes monitoring information generated by the monitoring functionality, and the instructions, when executed, further cause the processor to access an identifier received, via a network interface, from the remote monitoring entity, the identifier to identify the monitoring information to the remote monitoring entity.

7. A media presentation device comprising:
a network interface;
memory including machine readable instructions; and
processor circuitry to execute the machine readable instructions to at least:

present, via a display, a graphical enable button that, when selected, is to enable monitoring functionality implemented by the media presentation device, the monitoring functionality to monitor media presented by the media presentation device, the monitoring functionality to be disabled by default, the monitoring functionality installed in the media presentation device at a time of manufacture of the media presentation device;

detect a first user input corresponding to selection of the graphical enable button; and in response to detection of the first user input:
enable the monitoring functionality implemented by the media presentation device, the monitoring functionality including a watermark generator and a lookup table;

transmit, via the network interface, information to a remote monitoring entity;

receive, from the remote monitoring entity, updated identification information for updating the lookup table;

determine application identification information for a media presentation application executing on the media presentation device;

determine a first watermark corresponding to application identification information from the lookup;

request media identification information for media from the media presentation application, the media identification information associated with media to be presented by the media presentation device;

determine a second watermark corresponding to the media identification information from the lookup table; and insert the first watermark and the second watermark into the media to be presented by the media presentation device prior to the output of the media by the media device.

8. The media presentation device of claim 7, wherein the processor circuitry is to present the graphical enable button in response to the media presentation device being powered on.

9. The media presentation device of claim 7, wherein the processor circuitry is further to:

present, via the display, a graphical disable button that, when selected, is to disable the monitoring functionality implemented by the media presentation device;

detect a second user input corresponding to selection of the graphical disable button; and disable the monitoring functionality implemented by the media presentation device in response to detection of the second user input.

10. The media presentation device of claim 7, wherein the processor circuitry is to present the graphical enable button in response to access of a menu to be presented by the media presentation device.

11. The media presentation device of claim 7, wherein the information includes demographic information, and the processor circuitry is further to present a form via the display in response to the detection of the first user input, the form to request the demographic information.

12. The media presentation device of claim 11, wherein the information includes monitoring information generated by the monitoring functionality, and the processor circuitry is further to access an identifier received, via a network interface, from the remote monitoring entity, the identifier to identify the monitoring information to the remote monitoring entity.

13. A method comprising:
presenting, by executing an instruction with a processor, a graphical enable button via a display of a media presentation device, the graphical enable button, when selected, to enable monitoring functionality implemented by the media presentation device, the monitoring functionality to monitor media presented by the media presentation device, the monitoring functionality to be disabled by default, the monitoring functionality installed in the media presentation device at a time of manufacture of the media presentation device;

detect, by executing an instruction with the processor, a first user input corresponding to selection of the graphical enable button; and in response to detection of the first user input:
enabling, by executing an instruction with the processor, the monitoring functionality implemented by the media presentation device, the monitoring functionality including a watermark generator and a lookup table;

transmitting, via a network interface, information to a remote monitoring entity;

receiving, from the remote monitoring entity, updated identification information for updating the lookup table;

determining application identification information for a media presentation application executing on the media presentation device;

determining a first watermark corresponding to application identification information from the lookup table;

requesting media identification information for media from the media presentation application, the media identification information associated with media to be presented by the media presentation device;

determining a second watermark corresponding to the media identification information from the lookup table; and inserting the first watermark and the second watermark into the media to be presented by the media presentation device prior to the output of the media by the media device.

14. The method of claim 13, wherein the presenting of the graphical enable button is performed in response to the media presentation device being powered on.

15. The method of claim 13, further including:

presenting, via the display, a graphical disable button that, when selected, is to disable the monitoring functionality implemented by the media presentation device;

detecting a second user input corresponding to selection of the graphical disable button; and disabling the monitoring functionality implemented by the media presentation device in response to detection of the second user input.

16. The method of claim 13, wherein the presenting of the graphical enable button is performed in response to access of a menu to be presented by the media presentation device.

17. The method of claim 13, wherein the information includes demographic information, and further including presenting a form via the display in response to the detection of the first user input, the form to request the demographic information.

18. The method of claim 17, wherein the information includes monitoring information generated by the monitoring functionality, and further including accessing an identifier received, via a network interface, from the remote monitoring entity, the identifier to identify the monitoring information to the remote monitoring entity.

* * * * *

UNITED STATES PATENT AND TRADEMARK OFFICE
CERTIFICATE OF CORRECTION

| | | |
|---|---|---|
| PATENT NO. | : 11,233,664 B2 | |
| APPLICATION NO. | : 16/355262 | |
| DATED | : January 25, 2022 | |
| INVENTOR(S) | : McMillan | |

It is certified that error appears in the above-identified patent and that said Letters Patent is hereby corrected as shown below:

In the Claims

In Claim 7, Column 16, Line 2 insert --table-- after "lookup".

Signed and Sealed this
First Day of August, 2023

Katherine Kelly Vidal
Director of the United States Patent and Trademark Office